Patented Dec. 12, 1950

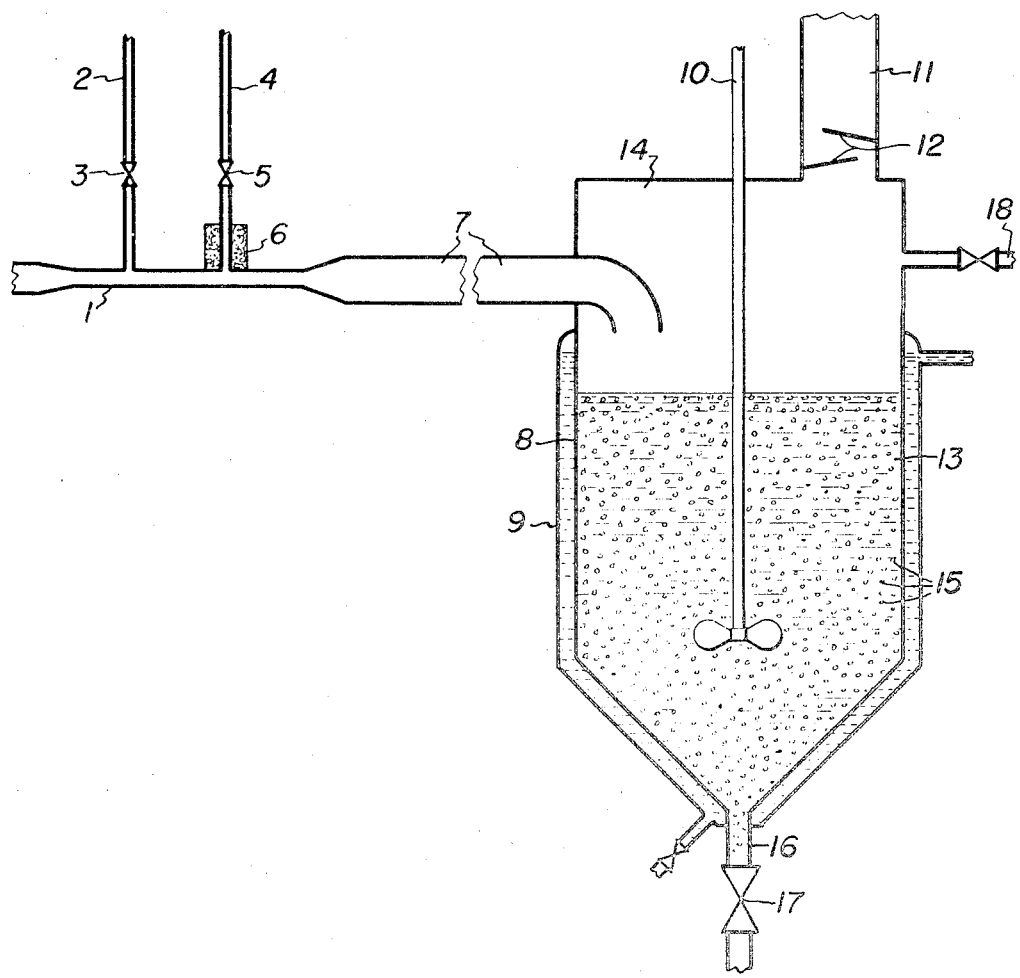
INVENTORS
DANIEL E. STRAIN and
HENRY PETERSON
BY
ATTORNEY

2,534,079

UNITED STATES PATENT OFFICE 2,534,079

GRANULAR POLYMERS AND PROCESS FOR THEIR PREPARATION

Daniel E. Strain, Wilmington, and Henry Peterson, Newport, Del., assignors to E. I. du Pont de Nemours & Company, Wilmington, Del., a corporation of Delaware Application March 19, 1948, Serial No. 15,868

7 Claims. (Cl. 260—17.4)

This invention relates to synthetic polymeric materials in granular form. More particularly it relates to hydrolyzed ethylene/vinyl ester interpolymers in the form of granular particles and to methods for preparing said granular particles.

The interpolymers with which this invention is concerned are the solid, macromolecular, hydrolyzed interpolymers having the empirical formula $(C_2H_4)_x.(C_2H_3OH)_y.(C_2H_3OR)_z$, wherein R is an acyl radical of an organic monocarboxylic acid and $x$, $y$ and $z$ are numbers, the ratio of $x$ to $(y+z)$ being within the range of from 1:1 to 4:1 (i. e., the mole ratio of ethylene to vinyl ester in the interpolymer prior to hydrolysis being within the range of from 1:1 to 4:1), and the ratio of $y$ to $z$ being at least 1:1, (i. e., the interpolymer being at least 50% hydrolyzed).

As disclosed in U. S. Patents 2,386,347 and 2,399,653 of John R. Roland, Jr., these interpolymers may be prepared by "hydrolysis" of an ethylene/vinyl ester interpolymer of suitable mole ratio of ethylene to vinyl ester. Frequently the "hydrolysis" is carried out using a low molecular weight alcohol in place of water, in which case the process may be referred to as "alcoholysis." The term "hydrolysis" as used herein and in the accompanying claims is therefore defined to include alcoholysis, as well as hydrolysis by means of water, and the term "hydrolyzed" refers to interpolymers resulting from alcoholysis, as well as those resulting from actual water hydrolysis, of the ethylene/vinyl ester interpolymers. The interpolymers are referred to as being "hydrolyzed" when at least 50% of the ester groupings have been converted to hydroxyl groups.

Hydrolysis or alcoholysis of the ethylene/vinyl ester interpolymers is preferably carried out by dissolving the interpolymer in a primary alcohol which is liquid at 25° C., such as methanol or ethanol, or in a mixture of said alcohol and a hydrocarbon, such as toluene, containing at least 20% by weight of said alcohol, and then treating with a suitable hydrolyzing agent or catalyst such as alkali or mineral acid. The hydrolysis may be partial or complete, depending upon the nature of the solvent, the amount and kind of catalyst used, and the time and temperature of reaction.

The interpolymers from which the products of this invention may be derived include those of ethylene with vinyl formate, vinyl acetate, vinyl propionate, vinyl butyrate, vinyl stearate, vinyl benzoate, etc. Inasmuch as the acid group of the vinyl ester is, in many instances, removed by hydrolysis, it is usually most economical to use an interpolymer of ethylene with vinyl acetate since this is the most readily available vinyl ester.

Both the completely hydrolyzed and the partially hydrolyzed interpolymers have attractive properties which render them particularly suitable for use as films, filaments, coatings, injection moldings, extruded products, and the like. One difficulty with these hydrolyzed interpolymers, however, has been that there has been no completely satisfactory method heretofore for isolating them in order to transport or ship them to fabricators. Roland discloses isolating the hydrolyzed products by steam distillation of the solvent, or by precipitation followed by simple filtration. The products thus obtained may be in an agglomerated form or they may be in the form of irregular, curd-like particles having a pronounced tendency to agglomerate.

It is an object of this invention to provide interpolymers of the type hereinbefore defined, said interpolymers being in a form in which they may be readily handled, transported and shipped. Another object of this invention is to provide said interpolymers in the form of discrete, granular particles. A further object is to provide said interpolymers in the form of discrete, granular particles coated with a thin film of colloidal material. A still further object is to provide methods for producing the interpolymers in these various forms. Other objects of the invention will appear hereinafter.

Accordingly this invention provides solid, hydrolyzed interpolymers of the type hereinbefore described, said interpolymers being in the form of discrete, granular particles. The individual particles, which may vary in size from 6 to 150 mesh, may be encased in, or coated with, a thin film of a colloidal substance such as starch, glue, gelatin, casein, albumin, methyl starch, sodium stearate, zinc stearate, and the like. As a preferred embodiment of the invention, the interpolymer is that obtainable by hydrolyzing at least 95% of the ester groupings in an ethylene/vinyl acetate interpolymer having an ethylene:vinyl acetate mole ratio of from 1.5:1 to 3.5:1. As additional preferred embodiments of the invention, the granular particles are encased in a thin film of potato starch, and the product is a light, fluffy powder whose individual particles vary in size from 10 to 40 mesh.

It has been found that these granular products may be prepared by a process which comprises bringing a stream of the hydrolyzed interpolymer in solution in a volatile solvent into direct contact in a constricted area with a stream of steam moving at such a velocity that the interpolymer is comminuted, or broken up into small particles, by reason of the impact with the steam, and thereafter maintaining the thus combined streams in highly turbulent flow until the solvent content of the interpolymer particles has been reduced by means of the said steam to below the level at which agglomeration of the particles occurs. The mixture which is discharged from the area of highly turbulent flow may be subjected to filtration or evaporation in order to isolate the interpolymer particles directly. Alternately, the solvent content of the interpolymer may be further reduced by contacting the particles with one or more baths containing a hot, agitated liquid which does not melt the interpolymer and which is a non-solvent therefor. Preferably such baths contain a small amount of a colloidal substance.

The invention can be more readily understood by reference to the attached drawing which diagrammatically illustrates one manner of conducting the process. A stream of high velocity steam is introduced through jet 1. To this stream, a dilute solution of a colloidal substance such as starch may, if desired, be added through inlet 2 and check-valve 3. The stream of hydrolyzed interpolymer in solution in a volatile solvent is injected through inlet 4 and check-valve 5. This inlet is provided with insulation 6 around the point at which it connects with jet 1 in order to prevent evaporation of the solvent prior to the moment of direct impact between the solution and the stream of high velocity steam. The combined streams are then carried on into tail pipe 7 in which their high velocity and the continuing evaporation of solvent produce extremely turbulent flow conditions. Upon emerging from tail pipe 7, the interpolymer is in the form of granular, porous particles from which the greater part of the solvent has been removed. As shown in the drawing, the mixture emerging from the tail pipe may be introduced into a catch-pot 8 which is fitted with a steam-jacket 9, an agitator 10, and an exhaust line 11. Baffles may be used advantageously in the catch-pot. The exhaust line is provided with baffles 12. The catch-pot is partially filled with a hot, agitated, liquid medium 13 which is a non-solvent for the interpolymer and which in practice is usually water. Preferably this water contains a small amount of colloidal substance. Above the liquid 13, there is a fairly large disengaging space 14 into which the tail pipe discharges. The interpolymer particles 15 drop down into the liquid as shown, and after a hold-up time of maybe 10 minutes they are withdrawn as slurry through pipe 16 and valve 17. Inlet pipe 18 is provided for introducing additional liquid or colloidal substance into the catch-pot. While in the catch-pot, the solvent content of the particles is further reduced and various impurities which are soluble in the liquid medium, such as any remaining hydrolysis catalyst, are removed. The effluent from the catch-tank may be cooled, filtered and dried or if desired it may be subjected to further purification treatment. The gases which go off through exhaust line 11 contain the vaporized solvent which may be recovered and reused.

The isolation process of this invention may be carried out using as the solvent any volatile liquid which will dissolve the hydrolyzed interpolymer. As examples of suitable solvents there may be mentioned the lower alcohols such as methanol, ethanol, propanol, isobutanol, etc., or mixtures thereof with various other solvents such as benzene, toluene, xylene, pyridine, dioxane, trichloroethylene. Water may be used in admixture with methanol, ethanol, acetic acid, acetone, dioxane, etc. Preferred solvents are those containing from 20 to 50% of methanol and from 20 to 50% of a hydrocarbon of the class consisting of toluene and xylene. The concentration of the interpolymer in the solvent may vary within wide limits.

Frequently the solution to be used in the isolation process will be that resulting from the step of hydrolyzing the ethylene/vinyl ester interpolymer. In that case, superior results are generally obtained if the isolation process is carried out within a short time after the hydrolysis step has been completed, and if the acid or alkaline catalyst used in the hydrolysis step is neutralized before the solution is introduced into the isolation equipment. For instance, if an alkaline catalyst, such as an alkali metal hydroxide, methoxide, ethoxide, or the like, has been employed, this may be neutralized with an acid such as acetic, stearic, etc., or a combination of these acids.

The various factors such as the choice of solvent, the concentration of the interpolymer therein, the composition of the interpolymer, the possible presence of neutralized catalyst, and the temperature at which the solution is to be introduced, all affect the ultimate design of the isolation equipment in ways which will be readily apparent to those skilled in the art.

The introduction of a colloidal substance into the stream of high velocity steam is optional. In the case of interpolymer compositions which have a strong tendency to agglomerate, the use of a colloid may be very beneficial, whereas in other cases, it will not be necessary. The colloidal substance is usually added in the form of a dilute admixture with water, and it is added at temperatures and in amounts such that it does not destroy the impact power of the steam.

Contact between the high velocity steam and the solution of hydrolyzed interpolymer may be established in any suitable confined or constricted area to which there is attached suitable apparatus through which the combined streams may flow away under highly turbulent flow conditions. Very satisfactory results have been achieved by introducing the steam through a jet throat whose inside diameter is from ⅛ inch to ½ inch, and introducing the interpolymer solution into said jet throat through an inlet line of somewhat smaller diameter. These lines may intersect at about right angles or at smaller angles. If a jet throat of this nature is employed, its length should be from 1 to 32 times its diameter. The steam may be introduced under a pressure, say, of ten to several hundred pounds per square inch gauge. Its velocity should be of the order of 500 feet per second or higher and may advantageously be as high as 1500 feet per second. Preferably the steam velocity is within the range of from 600 to 750 feet per second.

The tail pipe is generally of somewhat larger inside diameter than that of the original contact area in order to be able to handle the increased volume resulting from volatilization of the solvent. Preferably its inside diameter is from 1½ to 6 times the diameter of the jet throat and its length is from 100 to 400 times its inside diameter. Good results may be obtained with tail pipes varying in length from one foot up to twenty feet or more. If desired, the tail pipe may be constructed in several successive sections, each of which has a larger inside diameter than the preceding section. The velocity of the mixture emerging from the tail pipe should be of the order of 350 feet per second or higher.

This type of isolation equipment may be so positioned that the flow of materials therethrough is in a horizontal, vertical, or inclined direction or in any combination of these directions. Suitable construction materials include stainless steels, mild steels, various alloys, silver-lined equipment, etc.

A convenient method for separating the interpolymer particles as they emerge from the area of highly turbulent flow involves the use of a catch-pot as shown in the drawing. Water is the most practical liquid medium for use therein and preferably the water contains from 0.1 to 2.0% of a colloidal substance such as potato starch. The temperature at which the bath is maintained will depend upon the choice of solvent. When a mixed solvent of methanol plus either toluene or xylene is employed, the bath temperature may be from 90° to 95° C. The interpolymer particles can be discharged above the liquid medium, as depicted in the drawing, or they may be discharged with equal effectiveness directly into the liquid medium itself, preferably not more than 6 inches below the liquid surface. Hold-up times of from 5 to 30 minutes in such a catch-pot have proved entirely satisfactory.

The following examples illustrate certain specific embodiments of the process of this invention. The various pieces of equipment mentioned are designated by numerals referring to the corresponding parts of the attached drawing.

*Example 1.*—This example shows the isolation of an interpolymer which is about 97 to 98% hydrolyzed and which is derived from an ethylene/vinyl acetate interpolymer containing a mole ratio of ethylene to vinyl acetate of 2.7:1. The solution resulting from the preparation of this interpolymer by hydrolysis contains 15 parts by weight of the interpolymer, 60 parts of xylene, 20 parts of methanol, 4.7 parts of methyl acetate (resulting from the hydrolysis), and 0.3 part of sodium methylate (hydrolysis catalyst). This solution is neutralized with stearic acid and introduced at about 67° C. and at the rate of about 700 grams per minute through inlet 4 whose inside diameter is about 0.04 in. Steam at 60 pounds pressure is introduced at the rate of 360 grams per minute into jet throat 1 whose inside diameter is $\frac{3}{16}$ in. and whose length is 3 in. A 2% solution of potato starch is introduced through inlet 2 at the rate of 100 grams per minute. The force of the steam comminutes the interpolymer and carries it into tail pipe 7 which is 8 ft. long and $\frac{5}{8}$ in. inside diameter. The mixture discharges from the tail pipe into the disengaging space 14 of the catch-pot 8. The vaporized solvent is removed through exhaust pipe 11 and recovered. The interpolymer particles drop down into the agitated water 13 which contains 0.5% of potato starch and which is kept at 94° C. A hold-up time of 10 minutes in the catch-pot reduces the ash content of the interpolymer to 0.26%. The slurry of interpolymer particles and water is withdrawn through pipe 16 and filtered, the filtrate being returned to the catch-pot via inlet pipe 18 is desired. The particles, which have a thin coating of starch on them are washed and dried, preferably in a rotary drier. The product is a white, porous, granular material which is ready for shipment. This product may be further purified, if desired, by steeping at 95° C. for an additional 20 to 40 minutes in a fresh aqueous colloid-containing bath under vigorous agitation, and thereafter centrifuging, washing and drying.

*Example 2.*—A process similar to that of Example 1 is carried out, with the exception that a larger jet throat 1 is employed and the steam and interpolymer solutions are added more rapidly. Using a jet throat whose inside diameter is $\frac{5}{16}$ in., the interpolymer solution is added about twice as rapidly as in Example 1 and the steam is introduced at about 3 times the rate shown in Example 1. The product is fine, porous and very easily handled.

*Example 3.*—A process similar to that of Example 1 is carried out with the exception that the interpolymer which is isolated is hydrolyzed to the extent of 74%. The product is a fine, granular, white material showing no tendency to agglomerate.

The processes described in the above examples may be varied within wide ranges. It will be noted, for instance, that the actual formation of the interpolymer particles is complete as the mixture leaves the area of highly turbulent flow and the subsequent recovery of the product may be carried out by a number of suitable methods in addition to that disclosed. The composition of the interpolymer, the solvent used to dissolve it, and the concentration of the interpolymer in the solvent may all be varied as set forth above. The ultimate particle size of the product may be varied by changing the amount and velocity of the steam used, the design of the area in which the interpolymer-steam impact occurs, the design of the area of highly turbulent flow, the colloidal substance used, etc. The scale on which the process is carried out can be altered as required.

The granular product obtained is valuable in that it may be easily handled and shipped. It can be readily converted into the many forms in which these interpolymers are useful. It may be purified to whatever extent necessary, and can be measured out and added to reactors for further chemical processing with great ease.

Since many modifications and advantageous uses of the processes and products of this invention will be apparent to those skilled in the art, it is not intended that this invention should be limited in any way other than by the following claims.

We claim:

1. In a process for isolating in granular form a solid macromolecular, hydrolyzed interpolymer having the empirical formula

$$(C_2H_4)_x.(C_2H_3OH)_y.(C_2H_3OR)_z,$$

wherein R is an acyl radical of an organic monocarboxylic acid and $x$, $y$ and $z$ are numbers, the ratio of $x$ to $(y+z)$ being within the range of from 1:1 to 4:1, and the ratio of $y$ to $z$ being at least 1:1, the steps which comprise bringing a stream of said interpolymer in solution in a volatile solvent into direct contact in a constricted area with a stream of steam moving at such a velocity that the interpolymer is comminuted by reason of the impact with the steam, and thereafter maintaining the thus combined streams in highly turbulent flow at a velocity of at least 350 feet per second until the solvent content of the interpolymer particles has been reduced by means of the said steam to below the level at which agglomeration of the particles occurs.

2. A process according to claim 1 in which the volatile solvent employed is one containing from 20% to 50% of methanol and from 80% to 50% of xylene.

3. A process according to claim 1 in which the velocity of the steam at the point where it contacts the solution of interpolymer is from 600 to 750 feet per second.

4. A process according to claim 1 in which a small amount of a solution of potato starch is introduced into the stream of steam prior to the point at which the steam comes into contact with the solution of interpolymer.

5. A process for preparing in granular form a solid, macromolecular, hydrolyzed interpolymer having the empirical formula $$(C_2H_4)_x.(C_2H_3OH)_y.(C_2H_3OR)_z,$$

wherein R is an acyl radical of an organic monocarboxylic acid and $x$, $y$ and $z$ are numbers, the ratio of $x$ to $(y+z)$ being within the range of from 1:1 to 4:1, and the ratio of $y$ to $z$ being at least 1:1, which process comprises bringing a stream of said interpolymer in solution in a volatile solvent into direct contact in a constricted area with a stream of steam moving at such a velocity that the interpolymer is comminuted by reason of the impact with the steam, maintaining the thus combined streams in highly turbulent flow at a velocity of at least 350 feet per second until the solvent content of the interpolymer particles has been reduced by means of said steam to below the level at which agglomeration of the particles occurs and thereafter contacting the interpolymer particles with a hot, agitated, liquid medium which contains a colloidal substance and which is a non-solvent for the interpolymer.

6. A process according to claim 5 in which the solvent employed is one containing from 20% to 50% of methanol and from 80% to 50% of xylene, and in which the hot, agitated, liquid medium is a bath of water maintained at 90° to 95° C. and containing from 0.1 to 2.0% of potato starch.

7. In a process for isolating in granular, porous form a solid macromolecular, hydrolyzed interpolymer having the empirical formula $$(C_2H_4)_x.(C_2H_3OH)_y.(C_2H_3OR)_z,$$

where in R is an acyl radical of an organic monocarboxylic acid and $x$, $y$ and $z$ are numbers, the ratio of $x$ to $(y+z)$ being within the range of from 1:1 to 4:1, and the ratio of $y$ to $z$ being at least 1:1, the steps which consist of bringing a stream of said interpolymer in solution in a volatile solvent and a solution of colloidal substance into direct contact in a constricted area with a stream of steam moving at such a velocity that the interpolymer is comminuted by reason of the impact with the steam, and thereafter maintaining the thus combined streams in highly turbulent flow at a velocity of at least 350 feet per second until the solvent content of the interpolymer particles has been reduced by means of the said steam to below the level at which agglomeration of the particles occurs.

DANIEL E. STRAIN.
HENRY PETERSON.

REFERENCES CITED

The following references are of record in the file of this patent:

UNITED STATES PATENTS

| Number | Name | Date |
|---|---|---|
| 2,357,380 | Brant | Sept. 5, 1944 |
| 2,386,347 | Roland | Oct. 9, 1945 |
| 2,389,953 | Crawford | Nov. 27, 1945 |
| 2,399,653 | Roland | May 7, 1946 |

OTHER REFERENCES

Badger, Elements of Chemical Engineering (1936), pages 558–559, McGraw-Hill, New York.